(12) United States Patent
Moon

(10) Patent No.: US 11,829,428 B2
(45) Date of Patent: Nov. 28, 2023

(54) APP NAME SEARCH METHOD AND SYSTEM

(71) Applicant: VIMIO CO. LTD, Seoul (KR)

(72) Inventor: Bong Jae Moon, Seoul (KR)

(73) Assignee: VIMIO CO. LTD, Seoul (KR)

( * ) Notice: Subject to any disclaimer, the term of this patent is extended or adjusted under 35 U.S.C. 154(b) by 434 days.

(21) Appl. No.: 15/686,701

(22) Filed: Aug. 25, 2017

(65) Prior Publication Data
US 2018/0011940 A1 Jan. 11, 2018

Related U.S. Application Data

(63) Continuation of application No. PCT/KR2016/008785, filed on Aug. 10, 2016.

(30) Foreign Application Priority Data

Jul. 6, 2016 (KR) ........................ 10-2016-0085772

(51) Int. Cl.
*G06F 16/9535* (2019.01)
*G06N 20/00* (2019.01)
*G06F 16/242* (2019.01)
*G06F 16/2452* (2019.01)
*G06F 16/33* (2019.01)
*G06F 8/61* (2018.01)

(52) U.S. Cl.
CPC ............ *G06F 16/9535* (2019.01); *G06F 8/61* (2013.01); *G06F 16/243* (2019.01); *G06F 16/24522* (2019.01); *G06F 16/3337* (2019.01); *G06N 20/00* (2019.01)

(58) Field of Classification Search
CPC ............ G06F 16/9535; G06F 16/3337; G06F 16/24522; G06F 16/243; G06N 20/00
See application file for complete search history.

(56) References Cited

U.S. PATENT DOCUMENTS

| | | | |
|---|---|---|---|
| 8,250,046 B2* | 8/2012 | Heymans | G06F 16/3337 707/703 |
| 9,037,565 B2* | 5/2015 | Vaidyanathan | G06F 16/243 707/707 |
| 9,298,703 B2* | 3/2016 | Leydon | G06Q 30/0217 |
| 2006/0277535 A1 | 12/2006 | Ketzer | |

(Continued)

FOREIGN PATENT DOCUMENTS

| KR | 20050085581 | 8/2005 |
|---|---|---|
| KR | 20140027285 | 3/2014 |

(Continued)

*Primary Examiner* — Mariela Reyes
*Assistant Examiner* — Fernando M Mari Valcarcel
(74) *Attorney, Agent, or Firm* — CANTOR COLBURN LLP

(57) ABSTRACT

Provided is a method of searching for an app name in a user terminal. The user terminal requests a download of an app from an app storage server. The user terminal transmits a language set in the user terminal and an app name of the app to an app name processing server. The app name processing server acquires a word in the set language corresponding to the app name through a machine learning technique, and stores the acquired word in an app search database (DB) connected in the user terminal.

5 Claims, 13 Drawing Sheets

(56) References Cited

U.S. PATENT DOCUMENTS

| | | | |
|---|---|---|---|
| 2009/0058820 A1* | 3/2009 | Hinckley | G06F 3/04883 |
| | | | 345/173 |
| 2012/0190407 A1* | 7/2012 | Miura | G06F 40/274 |
| | | | 455/563 |
| 2012/0271828 A1 | 10/2012 | Raghunath | |
| 2013/0283262 A1* | 10/2013 | Rehtijarvi | G06F 8/60 |
| | | | 717/178 |
| 2013/0339378 A1* | 12/2013 | Zheng | G06F 16/3337 |
| | | | 707/760 |
| 2014/0040231 A1* | 2/2014 | Lin | G06F 16/951 |
| | | | 707/708 |
| 2014/0249797 A1 | 9/2014 | Liu et al. | |
| 2014/0378112 A1 | 12/2014 | Sugimoto | |
| 2015/0052145 A1 | 2/2015 | Choi et al. | |
| 2015/0302006 A1* | 10/2015 | Sasidharan | G06F 16/41 |
| | | | 707/741 |
| 2015/0310116 A1* | 10/2015 | Fan | G06F 16/9535 |
| | | | 707/731 |
| 2016/0110340 A1* | 4/2016 | Bojja | G06F 17/275 |
| | | | 704/9 |

FOREIGN PATENT DOCUMENTS

| | | | |
|---|---|---|---|
| KR | 20140064517 | | 5/2014 |
| KR | 20140098822 | | 8/2014 |
| KR | 20140128002 A | * | 11/2014 |
| KR | 20150020398 | | 2/2015 |

* cited by examiner

FIG. 1

(Step 101)
Smart phone 201 selects app of app market 202 and requests download

↓

(Step 102)
Smart phone 201 transmits information on 'set language' (for example, Chinese) of smart phone 201 or 'languages of installed keyboard' (for example, Chinese and English) and information on 'name' (for example, Samsung Music) of download-requested or downloaded app to server 203

↓

(Step 103)
Server 203 determines whether Chinese word information corresponding to 'Samsung Music' is present in existing records (DB: 203-1), and transmits determination result to smart phone 201
When Chinese word information is not present, server 203 converts 'Samsung Music' according to Chinese loanword orthography, acquires reliable Chinese word "三星音乐" based converted word through machine learning technique, and transmits acquired word to smart phone 201

↓

(Step 104)
Smart phone 201 receives transmitted word, and updates app search DB 201-1 embedded in smart phone 201

↓

(Step 105)
Although "三星音乐" is inputted as Chinese search word (set language or keyboard language) instead of 'Samsung Music' when an app is searched for in the smart phone 201, app installed with name of 'Samsung Music' is searched for

FIG. 3

< Android >

InputMethodManager imm

InputMethodSubtype ims

String locale = ims.getLocale();

<iOS>

[UITextInputMode currentInputMode]

-primaryLanguage ← NSString "es"

APP NAME SEARCH METHOD AND SYSTEM

CROSS-REFERENCE TO RELATED APPLICATION

This application is a continuation of PCT Patent Application No. PCT/KR2016/008785 filed on Aug. 10, 2016, which claims priority to and the benefit of Korean Patent Application No. 10-2016-0085772 filed on Jul. 6, 2016, and the entire disclosures of which are incorporated herein by reference.

TECHNICAL FIELD

The present invention relates to a method and system for searching for the name of an application (app) installed in an IT (Information Technology) device such as a smart phone.

RELATED ART

The active use of smart phones has increased the number and kinds of applications (apps) for smart phones. On the original purchase of a smart phone, many apps are basically installed in the smart phone. In most cases, however, a user additionally installs necessary apps in the smart phone.

When the user continuously adds apps, a number of apps from several tens of apps to several hundreds of apps may be installed in the smart phone. In order to execute an app, the user typically tries to find the icon of the app while turning over the screens on which the icons of the installed apps are arranged, and then touches the icon to execute the app. However, when the number of installed apps is excessively large, it may take quite a long time to find the icon of a desired app. When the user finds the icon of an app while scrolling several screens, the user may turn over a screen even though the app is located on the screen. Furthermore, when an app icon is present in a folder, it is difficult for the user to intuitionally find the app icon.

In order to solve such a problem, smart phones typically have a function of searching and finding an app name. That is, when a user executes an app name search menu and inputs all or part of an app name, the smart phone shows all apps including the input characters.

DISCLOSURE

Technical Problem

The app name search method in the related art has the following problems.

When a smart phone user downloads a smart phone app from PlayStore or another store (also referred to as a market), an icon capable of executing the smart phone app is generated in the smart phone. Under the icon, the name of the app is displayed in a small size. In order to prepare for the case that a number of icons are installed, the smart phone provides the above-described app name search function. However, the app name search function is not perfect. For example, when "스타벅스 (meaning Starbucks in English)" is inputted to a search bar even though the name of the app was registered as "Starbucks", the app is not searched. That is, the app name search program does not associate "Starbucks" with "스타벅스", but performs searching only with the character string.

FIGS. 6, 7A, 7B and 8 show examples of an app name search according to the related art.

Suppose that a user inputted a character string "멜론 (meaning MelOn in English)" to an app search bar in a smart phone in which "MelOn" is installed as a music-related app, as an example different from Startbucks. However, FIG. 6 shows that there are no search results for the character string "멜론". Although the user clearly installed the app in the smart phone, the user encountered the situation that the app was not searched. Then, the user may consider the following two methods. First, the user may check all apps installed in the user's smart phone. Second, the user may think that the app name is not in Korean, and thus perform searching in a different language (for example, English).

The first method is to find the MelOn app among a plurality of app icons as shown in FIGS. 7A and 7B. FIG. 7A shows that the MelOn app is not present. Furthermore, since 'Google', '도우미 (meaning helper in English)' and '편의기능 (meaning convenient function in English)' are folders, the user must click the folders and check app icons contained the folders, in order to determine whether the MelOn app is present. Referring to FIG. 7B showing the next screen, the app name "MelOn" is found. That is, the app name was not searched for, because the app name is not in Korean but in English.

If the user did not pass through the first method but could think that the app name was registered in English, the user may use an app search function shown in FIG. 8.

For another example, even when "인터넷 (meaning Internet in English)" is used as a search word while the app name is "Internet", no search results are obtained. In this case, the user may be embarrassed. Then, when thinking that the app name is not "인터넷" but might be "Internet", the user can re-search for the app using "Internet" as a search word. However, the user may not think that the app is "Internet", and it is inconvenient for the user to re-search for the app, even though the user thought that the app might be "Internet". On the contrary, even when "Internet" is used as a search word while the app name is "인터넷", the same situation may occur.

In order to prepare against such a problem, the smart phone operating system (for example, Android or iOS) may provide a function of changing the language setting under limited availability. For example, when the language setting is changed to the English mode while the app name is displayed as "인터넷" in the Korean mode, the app name may be displayed as "Internet". In this case, however, when a search word is used as "Internet" in the Korean mode or used as "인터넷" in the English mode, no results are obtained.

According to another search method, an English app name may be automatically converted into a Korean app name based on the current loanword orthography, in order to search for the app. That is, when an English search word is inputted to the search word bar, searching is performed through the input search word. Furthermore, the English search word is converted into a Korean search word based on the loanword orthography, and searching is performed through the Korean search word. In many cases, however, there is a great difference between a pronunciation based on the loanword orthography and an actual pronunciation.

For example, suppose that an app with an app name of "Power Point" is installed. At this time, when a user inputs "Power" to the search word bar, the app name will be included in the search result. However, when "파워 (meaning Power in English)" is inputted to the search word bar in the system for assisting a search process using the above-described loanword orthography, the app name of "Power Point" may not be searched. That is because, when "Power Point" is read according to the current loanword orthography, "Power Point" may not be pronounced as '파워 포인트', but differently pronounced as '파우어 포인트' or '파우어 포인트', which also mean "Power Point" in English. Furthermore, Korean words corresponding to loanwords are not necessarily based on only pronunciations by the loanword orthography, but may be set to new words based on the meanings thereof. In this case, the loanword orthography may be useless.

For another example, when a search Word "삼싱 (meaning Samsung in English)" is inputted while an app name "Samsung" is present, no search results may be obtained through the system for assisting a search process using the above-described loanword orthography. That is because "Samsung" may be differently pronounced as '샘싱' or '섀숭' based on the loanword orthography.

Furthermore, since the app name "Starbucks" is highly likely to be pronounced as '스타벅스' or '스탈벅스' according to the loanword orthography, the app name "Starbucks" may be accurately searched for through the search word "스타벅스". However, the reliability of the system that can search for '스타벅스' but cannot search for '파우어 포인트' and '삼성' may be considered to be considerably low. Furthermore, even when Korean words corresponding to loanwords are set to new words based on the meanings of the loanwords without using the loanword orthography, the system may become useless.

Technical Solution

In an embodiment, a method of searching an application (app) name in a user terminal may include the steps of: (a) requesting, by the user terminal, a download of an app from an app storage server; (b) transmitting, by the user terminal, a language set in the user terminal and an app name of the app to an app name processing server; and (c) acquiring, by the app name processing server, a word in the set language corresponding to the app name through a machine learning technique, and storing the acquired word in an app search database (DB) connected in the user terminal.

Preferably, in the step (b), the set language may include information on the language set in the user terminal or a keyboard language installed in the user terminal.

Preferably, the step (c) may include the steps of: (c1) determining, by the app name processing server, whether information on the word in the set language corresponding to the app name is present in an app name DB connected to the app name processing server; (c2) transmitting, by the app name processing server, the information on the word in the set language to the user terminal, and updating, by the user terminal, the information on the word in the app search DB connected to the user terminal, when the determination result of the step (c1) indicates that the information on the word in the set language corresponding to the app name is present; and (c3) acquiring a name in the set language by converting the app name through the machine learning technique, and updating, by the user terminal, the app name in the app search DB connected to the user terminal, when the determination result of the step (c1) indicates that the information on the word in the set language corresponding to the app name is not present.

Preferably, in the step (c3), the app name processing server may acquire a converted app name by converting the app name according to the loanword orthography of the set language, and acquire a modified app name by modifying the converted app name through the machine learning technique, and the user terminal may update the app name corresponding to the modified app name in the app search DB connected to the user terminal.

Preferably, the app name may be represented in a first language, and the set language may be a second language different from the first language.

Preferably, when two or more keyboard languages are installed, the acquiring of the word in the set language in the step (c) may be performed for all of the two or more keyboard languages.

Preferably, the app name search method may further include, after the step (c), not only searching for only app names installed in the user terminal, but also searching for the word in the set language corresponding to the app name and stored in the app search DB, when performing an app name search in the user terminal.

In another embodiment, there is provided an app name search system that performs the above-described app name search method. The app name search system may include: the user terminal; the app storage server configured to receive an app download request from the user terminal; the app name processing server configured to receive the set language information and the app name from the user terminal and process the received information and name; the app name DB connected to the app name processing server; and the app search DB connected to the user terminal.

Advantageous Effects

According to the embodiments of the present invention, a user can search for an app even though the user does not accurately know the name of the app. For example, although "페이스북" is inputted as a search word even though the Facebook app is installed in a smart phone, the Facebook app can be searched for.

The present embodiments do not provide an app name search based on a simple translation, but provide a reliable app name search using the machine learning technique. When an app name is searched for only through a simple translation or according to the loanword orthography, the reliable app name in a different language may not be found in many cases (for example, when "Facebook" is an app name, "페이스북" is the name in Korean). According to the present embodiments, however, since the process of verifying the correctness of the name through a network is performed, the app name search can be reliably performed.

Furthermore, when an app name is searched for, the name is not searched for through the network in real time, and a DB is constructed in advance while an app is downloaded. Thus, when an app name is searched for, a high load is not applied to a user terminal (smart phone or the like).

BRIEF DESCRIPTION OF DRAWINGS

FIG. 1 is a flowchart showing an app name search method according to an embodiment of the present invention;

FIG. 3 shows codes for identifying a current set language or a language of a currently installed keyboard;

EXPLANATION FOR REFERENCE NUMERALS

Figure 2:
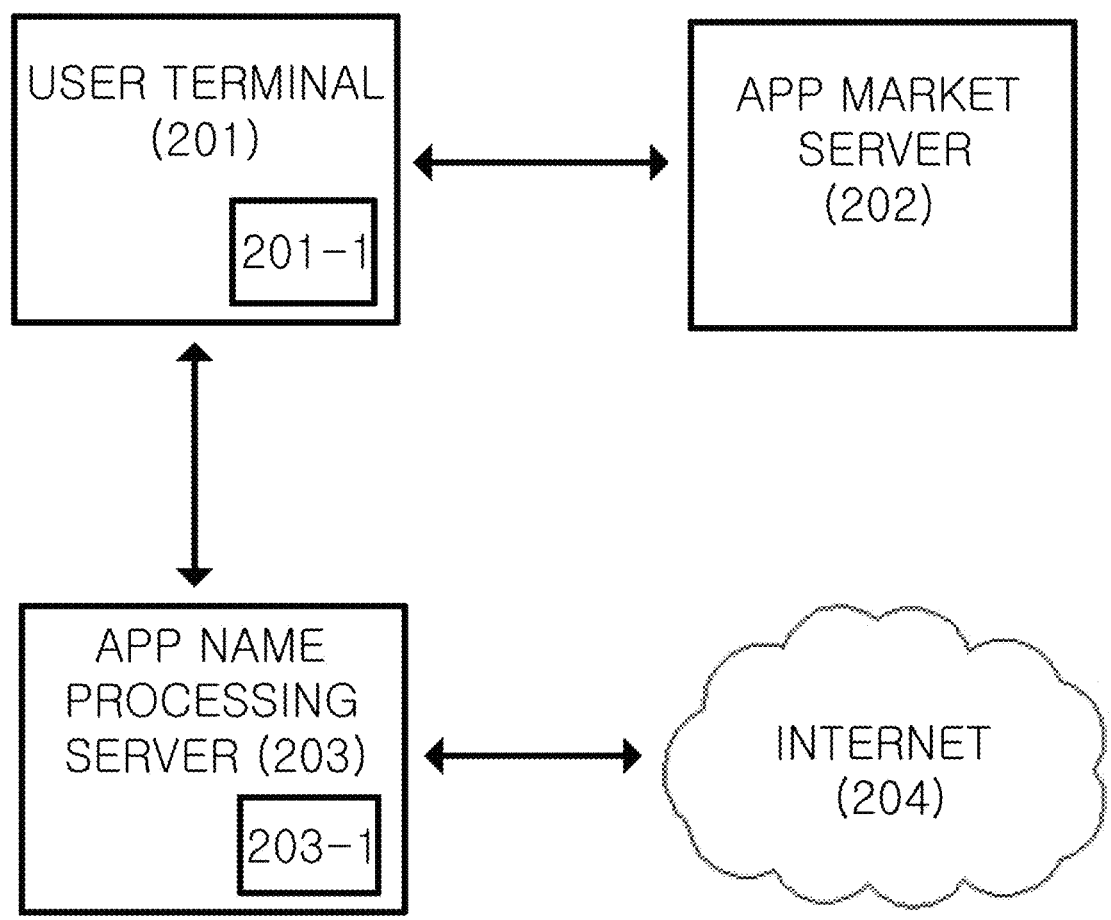
FIG. 2 is a conceptual view of an app name search system according to an embodiment of the present invention.

201: User Terminal
201-1: Database
202: Application Download Server (App Market Server)
203: App Name Processing Server
203-1: Database
204: Network (for example, internet)

MODES FOR CARRYING OUT THE INVENTION

According to an embodiment of the present invention, a method of searching an application (app) name in a user terminal may include the steps of: (a) requesting, by the user terminal, a download of an app from an app storage server; (b) transmitting, by the user terminal, a language set in the user terminal and an app name of the app to an app name processing server; and (c) acquiring, by the app name processing server, a word in the set language corresponding to the app name through a machine learning technique, and storing the acquired word in an app search database (DB) connected in the user terminal.

Preferably, in the step (b), the set language may include information on the language set in the user terminal or a keyboard language installed in the user terminal.

Preferably, the step (c) may include the steps of: (c1) determining, by the app name processing server, whether information on the word in the set language corresponding to the app name is present in an app name DB connected to the app name processing server; (c2) transmitting, by the app name processing server, the information on the word in the set language to the user terminal, and updating, by the user terminal, the information on the word in the app search DB connected to the user terminal, when the determination result of the step (c1) indicates that the information on the word in the set language corresponding to the app name is present; and (c3) acquiring a name in the set language by converting the app name through the machine learning technique, and updating, by the user terminal, the app name in the app search DB connected to the user terminal, when the determination result of the step (c1) indicates that the information on the word in the set language corresponding to the app name is not present.

Preferably, in the step (c3), the app name processing server may acquire a converted app name by converting the app name according to the loanword orthography of the set language, and acquire a modified app name by modifying the converted app name through the machine learning technique, and the user terminal may update the app name corresponding to the modified app name in the app search DB connected to the user terminal.

Preferably, the app name may be represented in a first language, and the set language may be a second language different from the first language.

Preferably, when two or more keyboard languages are installed, the acquiring of the word in the set language in the step (c) may be performed for all of the two or more keyboard languages.

Preferably, the app name search method may further include, after the step (c), not only searching for only app names installed in the user terminal, but also searching for the word in the set language corresponding to the app name and stored in the app search DB, when performing an app name search in the user terminal.

According to another embodiment, there is provided an app name search system that performs the above-described app name search method. The app name search system may include: the user terminal; the app storage server configured to receive an app download request from the user terminal; the app name processing server configured to receive the set language information and the app name from the user terminal and process the received information and name; the app name DB connected to the app name processing server; and the app search DB connected to the user terminal.

DESCRIPTION OF EMBODIMENTS

Hereafter, a system and method according to an embodiment of the present invention will be described with reference to the accompanying drawings.

FIG. 1 is a flowchart showing an app name search method according to an embodiment of the present invention.

At step 101, a user of an IT device such as a smart phone connected to a network (Internet or the like) tries to download a specific app from an app market through the IT device or completes the download. The IT device may include another IT device such as a tablet PC.

At step 102, the IT device transmits information on the 'current set language' or 'installed keyboard language' of the smart phone and information on the name of the download-requested app (or downloaded app) to a server through the network. For example, suppose that a language set by a user A is Chinese, installed keyboard languages are Chinese and English, and the name of a downloaded app is "Samsung Music".

At step 103, the server determines whether information on the word in Chinese, corresponding to "Samsung Music", is present among records stored therein, and transmits the determination result to the smart phone. When the information is not present, the server primarily searches for "Samsung Music" according to the Chinese loanword orthography. Then, based on the search result, the server learns that a Chinese word corresponding to "Samsung Music" is "三星音乐 (meaning Samsung Music in Chinese)", through the machine learning technique.

At step 104, the smart phone receives the search result, and updates an app search database (DB) embedded therein.

At step 105, when the user inputs a search word of "Samsung Music" in order to search for an app installed in the smart phone, the app installed with the name of "Samsung Music" is naturally searched for. Besides, even when the user inputs a search word of "三星音乐" in Chinese corresponding to the set language or installed keyboard language, the app installed with the name of "Samsung Music" can be searched for.

Hereafter, another example will be taken in order to describe the steps 101 to 105 in detail.

When the Facebook app is installed, the system language set in a current device (smart phone or the like) is checked. When it is assumed that the system language is Korean, "페이스북" corresponding to the Korean name of "Facebook" is added to search indexes.

An example of a method of learning that the word corresponding to the Korean name of "Facebook" is "페이스북" will be described as follows.

Through the network, a Korean word, a Japanese word and a Chinese word corresponding to "Facebook" are searched for based on the machine learning technique. That is, the words for the respective languages corresponding to "Facebook", which are spread on the Internet, are learned through the machine learning technique, or a model pair is constructed through a statistical machine translate technique or the like.

In the above-described example, the English and Chinese words (Samsung Music and 三星音乐) and the English and Korean word (Facebook and 페이스북) have been exemplified. However, the present invention can be applied to three or more languages.

For example, the Starbucks app may be named as various words such as "Starbucks", "星巴克 (meaning Starbucks in English)", "스타벅스" and "スターバックス (meaning Starbucks in English)". When only the app with a name of "Starbucks" is installed, the Android launcher has only the name of "Starbucks", and does not know about "星巴克", "스타벅스" and "スターバックス". According to the present embodiment, however, when the set language is Chinese or the Chinese keyboard is installed, the Starbucks app can also be found through a search word of "星巴克". Furthermore, when the set language is Korean or the Korean keyboard is installed, the Starbucks app can also be found through a search word of "스타벅스". In addition, when the set language is Japanese or the Japanese keyboard is installed, the Starbucks app can also be found through a search word of "スターバックス". Also, when the name of the installed app is "스타벅스" and the set language is Chinese, the "스타벅스" app can be found through the search word of "星巴克". That is, since "Starbucks", "星巴克", "스타벅스" and "スターバックス" are grouped with each other, searching can be performed between the search words. For this configuration, the search words may be searched and learned through deep learning by AI (Artificial Intelligence), and stored in a DB (for example, a DB 201-1 of a user terminal 201).

For example, a game app "Minecraft" may be represented by "我的世界" in Chinese, "マインクラフト" in Japanese, and "마인크래프트" in Korean. This information cannot be simply acquired through translation or the loanword orthography. For example, when the simple translation function is applied, 'mine' of "Minecraft" has various meanings such as a place where minerals are obtained, a device containing a charge of explosive, and something that belongs to me, and 'craft' also has various meanings such as an art requiring special skill, a process of manufacturing an object, an airplane, a vessel and a skill. Thus, it is difficult to determine how "Minecraft" is typically called. Furthermore, it may be estimated that "Minecraft" is just read to pronounce "Minecraft" as "마인크래프트" in Korean. However, this is only an estimation, and it is difficult to verify that "Minecraft" is pronounced as "마인크래프트" in Korean. Therefore, when the AI is controlled to go through the deep learning process or the machine learning process through the network, it is possible to verify that "Minecraft" is generally pronounced as "마인크래프트" in Korean, generally pronounced as "我的世界" in Chinese, and generally pronounced as "マインクラフト" in Japanese. This example shows that "Minecraft" was just read in Korean and Japanese and liberally translated into the Chinese word. This information cannot be simply obtained through a translation service or the loanword orthography. Furthermore, since all app names are neither just read to pronounce the app names in Korean and Japanese nor liberally translated into Chinese names, the necessity of the use of the network through deep learning by the AI gradually increases.

The operation of associating '마인크래프트', '我的世界', 'マインクラフト' and 'Minecraft' with each other or associating '삼성' and 'Samsung' with each other (that is, forming a pair or group) indicates constructing a kind of DB.

On the same principle, an app named "Samsung Pay" may be searched for through a search word of "삼성 페이". That is, an app represented in English can be searched for through a Korean search word.

The above descriptions have been focused on the app name search. However, the above-described function as well as the app name search can be implemented on a search tool 'S finder' which is mounted on smart phones made by Samsung Electronics, for example. The S finder can search not only app names but also other information (contact numbers and files) stored in the smart phone.

FIG. 2 is a conceptual view of an app name search system according to an embodiment of the present invention.

A user terminal 201 is connected to an app market server 202 to request an app download (related to the step 101 of FIG. 1). The user terminal 201 may include IT devices such as a smart phone and table PC, and the app market server 202 stores a variety of apps, transmits an app to the terminal, and is hereafter referred to as 'app storage server', for convenience of description.

When the app download is requested or completed, the user terminal 201 transmits information on the current set language of the user terminal or keyboard languages installed in the user terminal and name information of the download-requested or downloaded app to a server 203 (hereafter, referred to as an app name processing server 203). The name information may include "Samsung Music" exemplified in FIG. 1. The app market server 202 and the app name processing server 203 are separately illustrated in FIG. 2. However, when the app market server 202 is configured to also operate as the app name processing server 203, one server may perform two functions (related to the step 102 of FIG. 1).

As described above, the information transmission may be performed when the app download is requested or completed. However, the information transmission may be performed between when the app download is requested and when the app download is completed. Furthermore, timing within a predetermined time after the download is completed (for example, within ten minutes after the download is completed) may be included in the timing when the app download is performed.

The app name processing server 203 receiving the language information and the app name information searches a DB 203-1 thereof, and determines whether a record represented in the set language of the current terminal (for example, Chinese) and corresponding to the app name information "Samsung Music" is present among records stored in the DB 203-1. When the Chinese word "三星音乐" of the app name "Samsung Music" is present in the DB 203-1 of the app name processing server 203, the app name processing server 203 transmits the Chinese word to the user terminal 201. The user terminal 201 stores the Chinese word in an internal DB 201-1. The internal DB 201-1 may be stored as a file in a storage device of the user terminal 201 (related to the step 103 of FIG. 1).

When the Chinese word "三星音乐" of the app name "Samsung Music" is not present in the DB 203-1 of the app name processing server 203, the app name processing server 203 finds a Chinese word corresponding to "Samsung Music" based on the loanword orthography of the current set language (for example, Chinese). However, it is difficult to determine whether the found Chinese word is an actually used word. Therefore, the app name processing server 203 may not directly use the Chinese word obtained through the loanword orthography, but obtain information indicating that the Chinese word corresponding to "Samsung Music" is "三星音乐", while securing reliability through the machine learning technique used in a search engine or the like (related to step 103 of FIG. 1).

The DB 203-1 may not be necessarily present in the server 203, but the DB 201-1 may not be necessarily present in the user terminal 201. However, the DB 201-1 may be installed in the user terminal 201, for user's convenience.

The app name processing server 203 transmits the search result to the user terminal 201, the search result indicating the actually used word information which is obtained by checking the word based on the loanword orthography through the machine learning technique. The user terminal 201 updates the app search data of the DB 201-1 according to the received information (related to the step 104 of FIG. 1).

When an app name search is performed in the user terminal 201 after the above-described procedure, the Samsung Music app can be searched for through the search word of "三星音乐" as well as the search word of "Samsung Music" (related to the step 105 of FIG. 1).

FIG. 3 shows codes for identifying a current set language or currently installed keyboard language.

FIG. 3 shows codes for the Google Android and the Apple iOS, and codes for other operating systems can be identified on the same principle.

In the present embodiment, Korean, Chinese and English have been exemplified. However, the present embodiment is not limited thereto, but can be applied to all languages supported by the user terminal. The present embodiment can be applied to not only the case that the language of an app name is the same as the set language of the smart device, but also the case that the language of an app name is different from the set language of the smart device (for example, Korean, Chinese and the like) more usefully.

Examples of the languages supported by the smart device may include Japanese, Chinese, Deutsch, English, Espanol, French, Italian, Portugese, Tieng Viet, Russian, Korean and the like, and the above-described technical idea of the present invention can be applied to each of the languages.

Figure 4A:
FIGS. 4A to 4C show examples to which the present invention is applied.
Figure 4B:
Figure 4C:

FIGS. 4A to 4C show examples to which the present invention is applied.

When "Starbucks" is inputted to a search bar while the Starbucks app is installed in a smart phone, the app is naturally searched. According to the present embodiment, however, the Starbucks app can be searched for even though "스타벅스" is inputted to a name search bar as shown in FIG. 4A, searched for even though "星巴克" is inputted to the name search bar as shown in FIG. 4B, and searched for even though "スターバックス" is inputted to the name search bar as shown in FIG. 4C.

Most IT devices may have one kind of set language, but include keyboards in a plurality of languages. When all of the Korean keyboard, the English keyboard, the Chinese keyboard and the Japanese keyboard are installed in a smart phone, the Korean word, the Chinese word and the Japanese word corresponding to the app name "Starbucks" may be updated into the app search DB 201-1 of the smart phone 201 while the Starbucks app is downloaded. Therefore, according to the present embodiment, the Starbucks app can be searched for through any one of Korean, English, Chinese and Japanese. This configuration provides great convenience to a user.

Figure 5A:
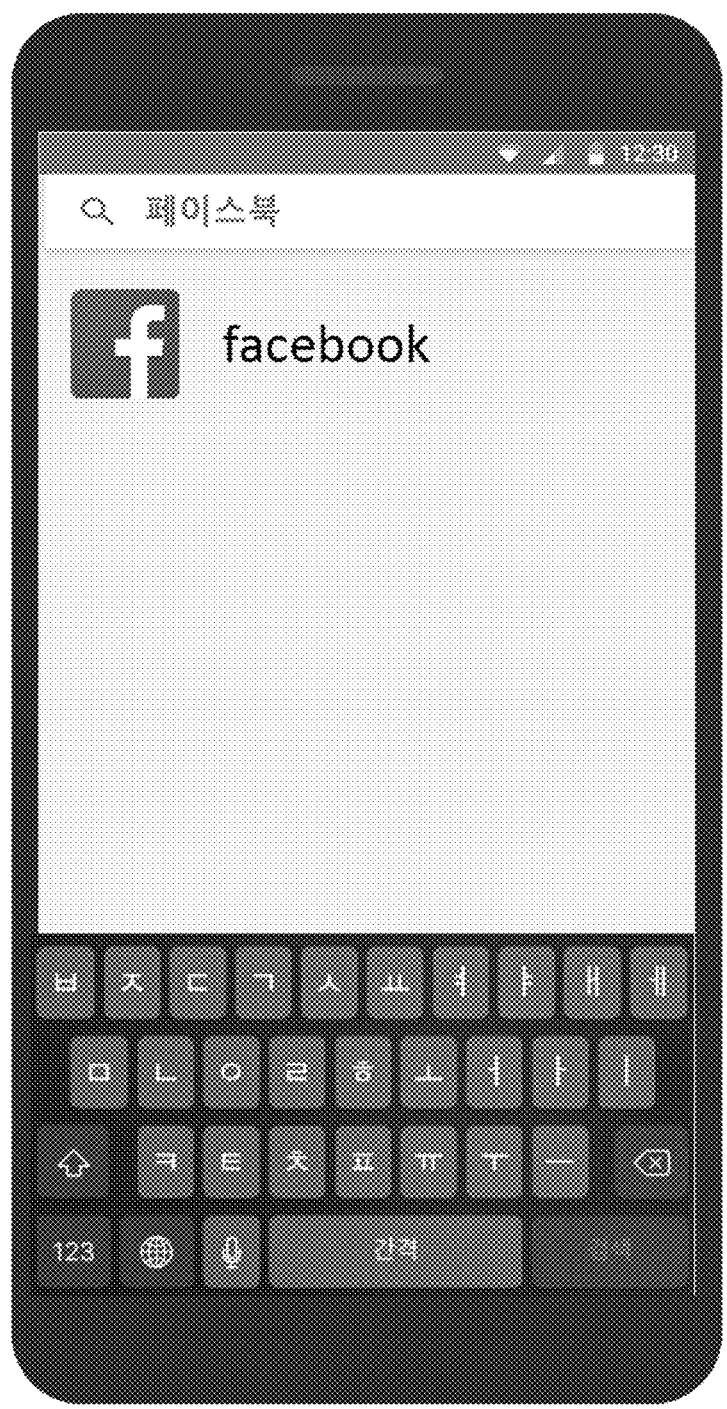
FIGS. 5A to 5C show another examples to which the present invention is applied.
Figure 5B:
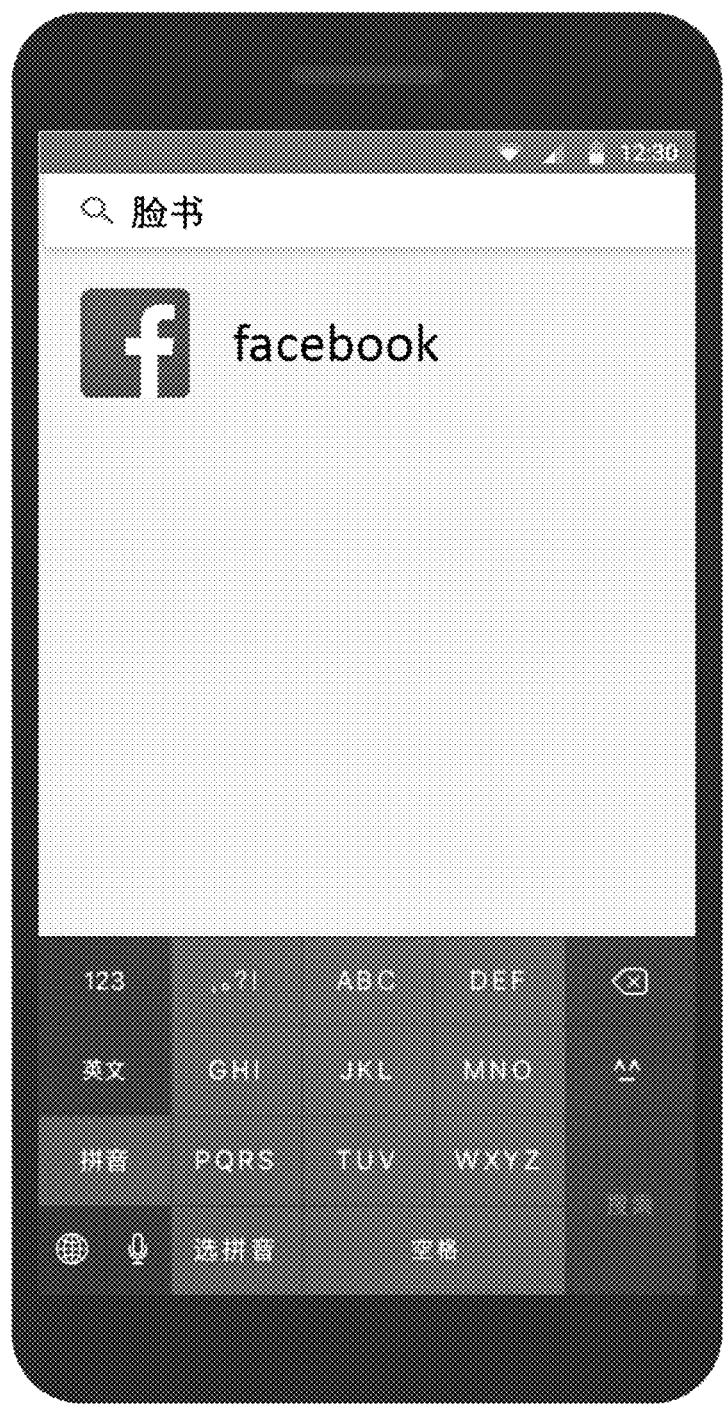
Figure 5C:
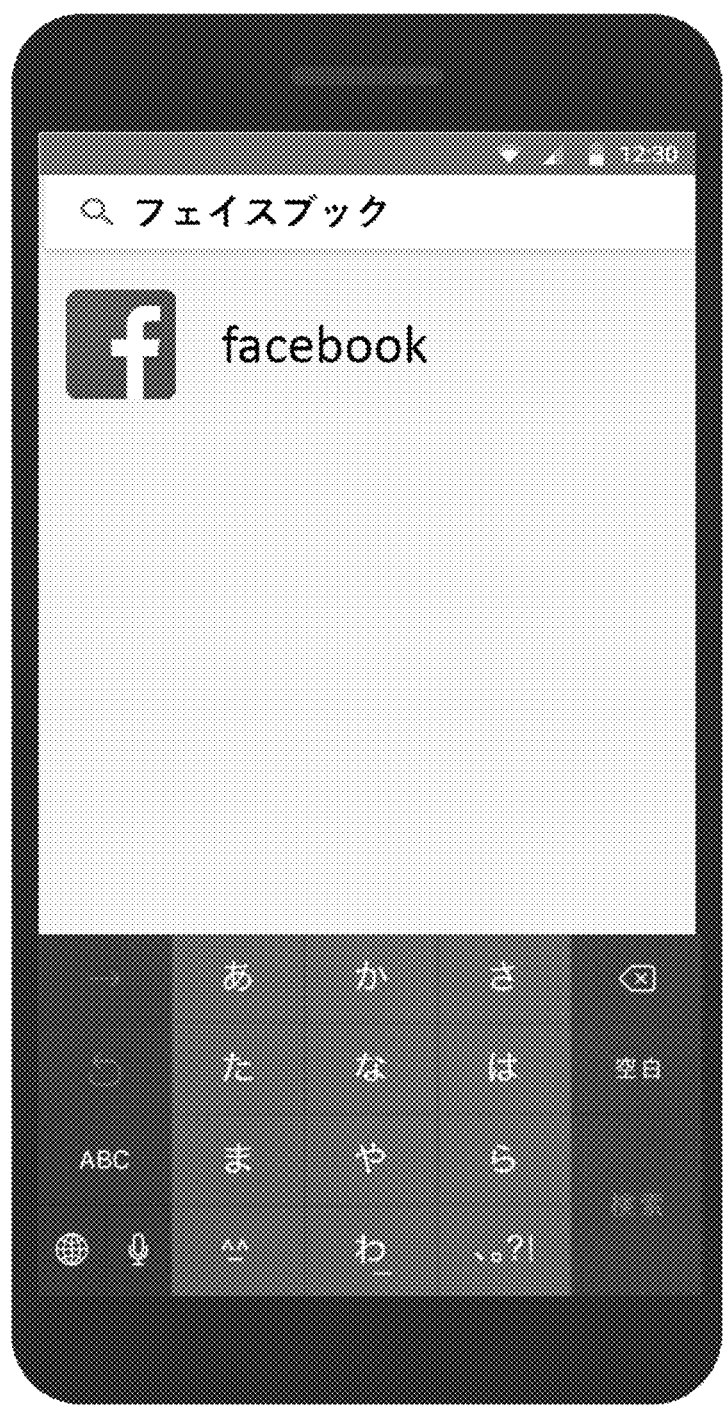
Figure 6:
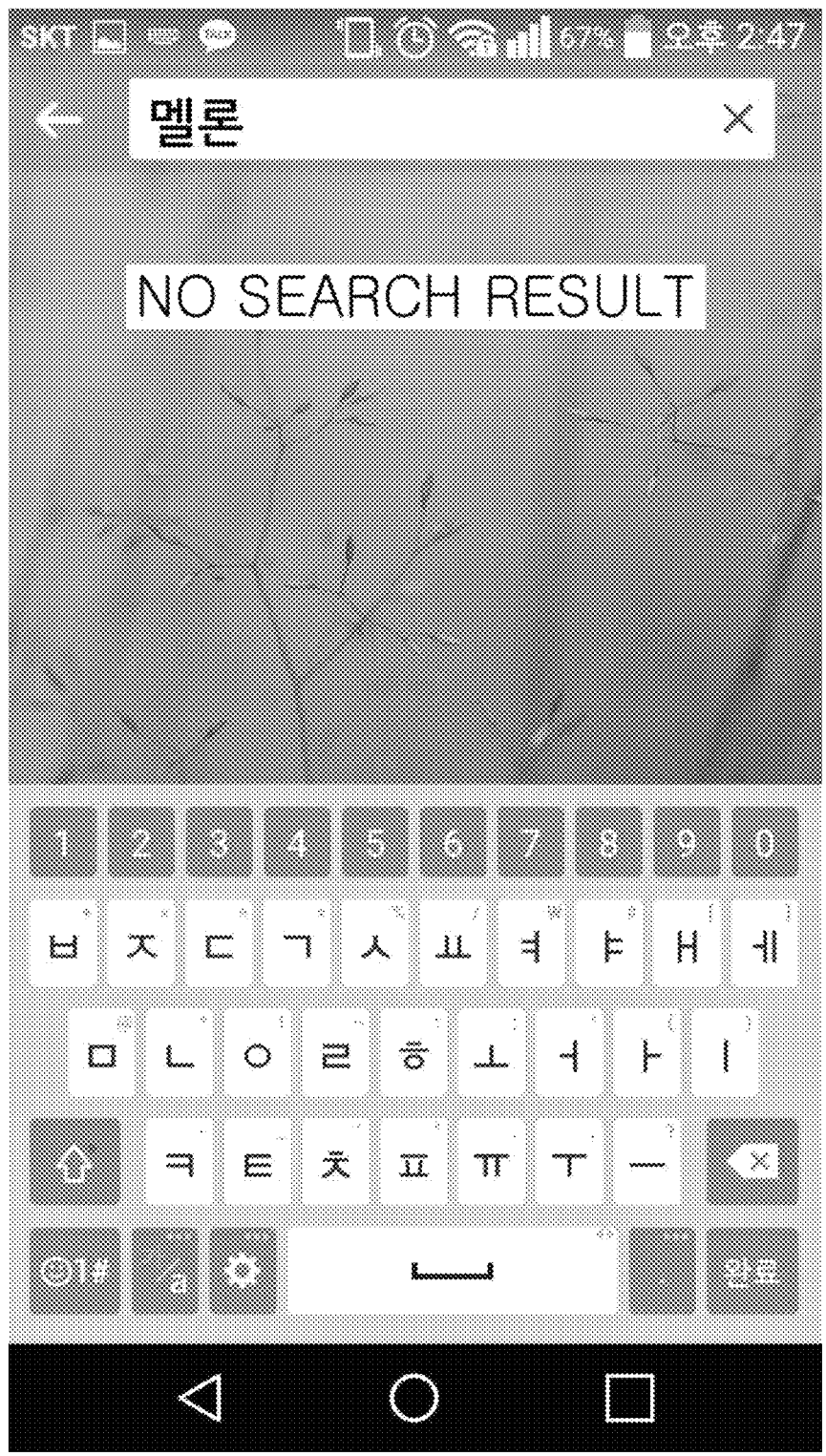
FIG. 6 shows an example of an app name search method in the related art.
Figure 7A:
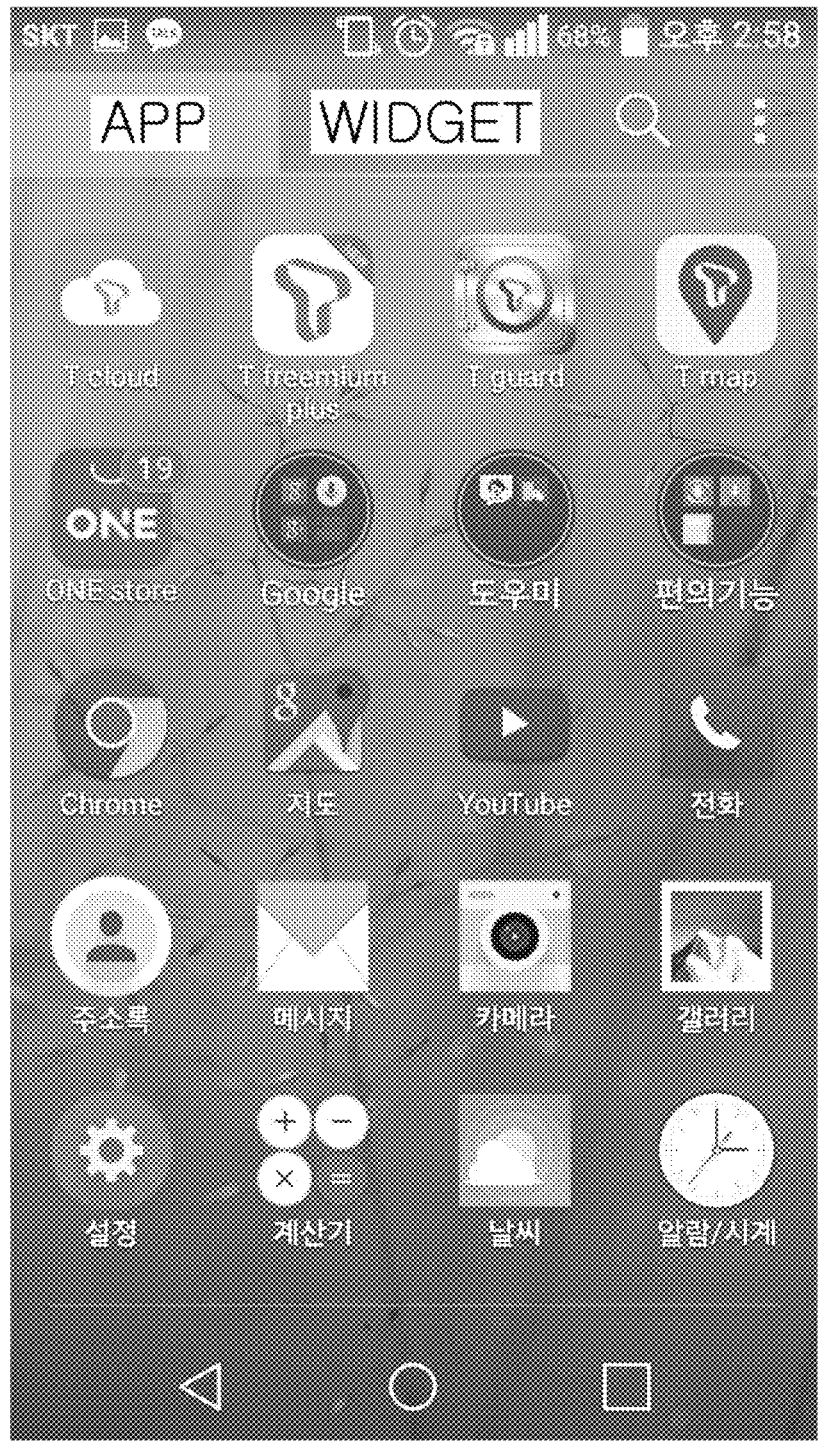
FIGS. 7A and 7B show examples of the app name search method in the related art.
Figure 7B:
Figure 8:
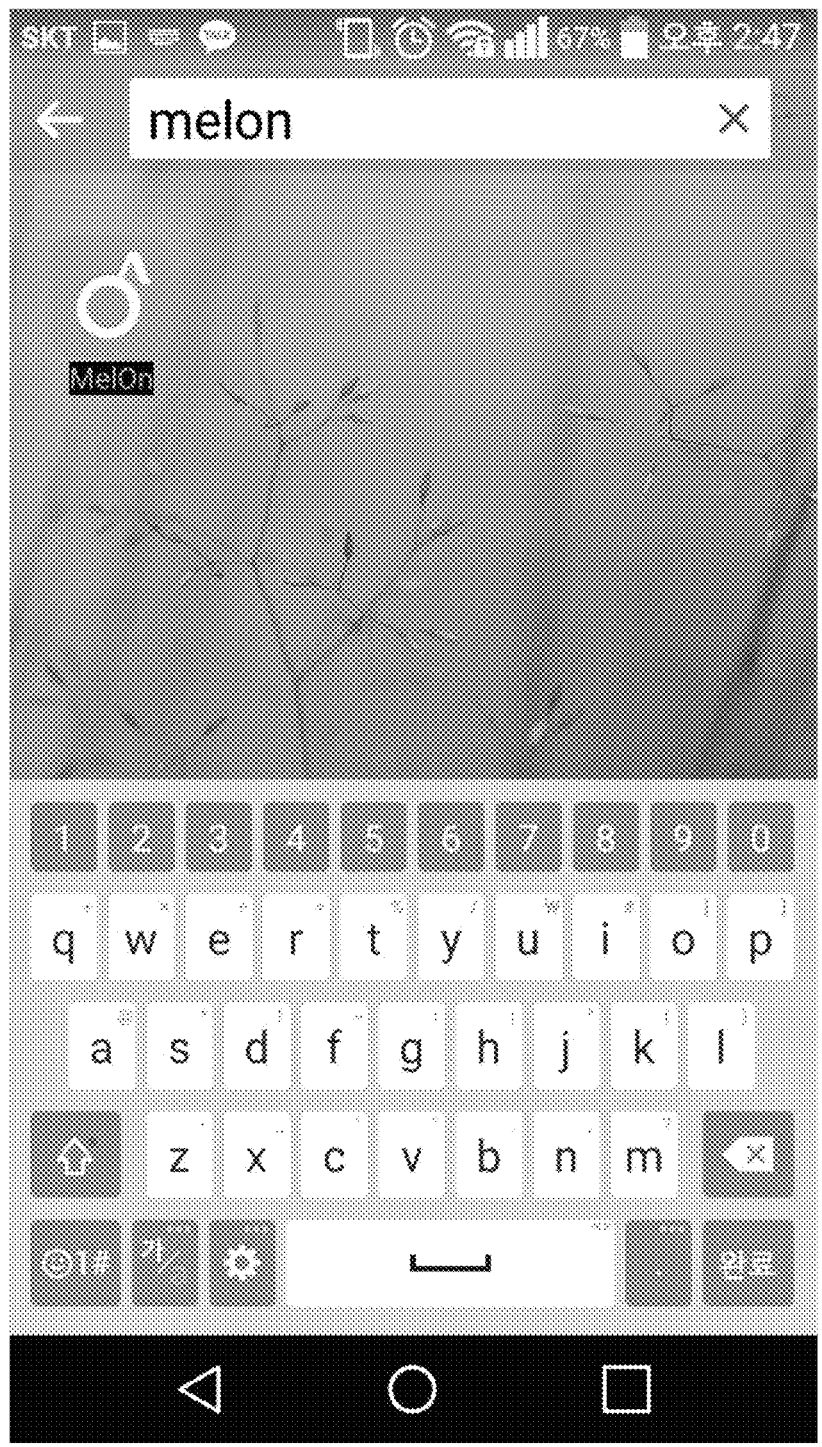
FIG. 8 shows an example of the app name search method in the related art.

FIGS. 5A to 5C show another examples to which the present invention is applied.

When "Facebook" is inputted to a search bar while the Facebook app is installed in a smart phone, the app is naturally searched for. According to the present embodiment, however, the Facebook app can be searched for even though "페이스북" is inputted to a name search bar as shown in FIG. 5A, searched for even though "脸书" is inputted to the name search bar as shown in FIG. 5B, and searched for even though "フェイスブック" is inputted to the name search bar as shown in FIG. 5C. This configuration also provides great convenience to a user.

FIGS. 4A to 5C show that a word is directly inputted through a keyboard in a specific language. For example, when a Japanese string (for example, "スターバックス") copied from another place is pasted to the search bar even though the Korean keyboard is enabled and used as illustrated in FIGS. 4A and 5A, the Japanese search word can be inputted even though the Japanese keyboard is not enabled. When the Japanese word "スターバックス" corresponding to "Starbucks" is stored in the DB 201-1, the Starbucks app will appear in the search result.

Since the set language and the keyboard languages correspond to the languages used in the smart phone, a group or pair of app names corresponding to only the set language and the keyboard languages may be made to minimize the data traffic and computation. This case is shown in the above-described example. In a modification, however, several languages (English, Japanese, Chinese, French and German) may be set in advance regardless of the set language and the keyboard languages, and app name information on the respective languages can be obtained when an app is downloaded. In this case, since the data traffic and computation are increased, the languages may be set in advance, among the entire set or subsets of all languages supported by the operating system of the smart phone. If necessary, the number and kinds of languages may be properly limited.

Although various embodiments have been described for illustrative purposes, it will be apparent to those skilled in the art that various changes and modifications may be made without departing from the spirit and scope of the invention as defined in the following claims.

INDUSTRIAL APPLICABILITY

The present invention has industrial applicability as the method and system for searching for an app name installed in an IT device such as a smart phone.

What is claimed is:

1. A method of searching an application (app) name among applications which are already installed in a user terminal, comprising the steps of:
(a) requesting, by the user terminal, a download of an app from an app storage server, wherein an app name of the app to be downloaded is already specified;
(b) transmitting, by the user terminal, a set language of the user terminal and the specified app name to an app name processing server, wherein the set language includes a language which is currently set in the user terminal or a keyboard language installed in the user terminal;
(c1) determining, by the app name processing server, whether a corresponding word in the set language which one-to-one corresponds to the app name is present in existing records of correspondence in an app name database (DB) of the app name processing server;
(c2) if the determination result of the step (c1) indicates that the corresponding word in the set language which one-to-one corresponds to the app name is present in the existing records of correspondence in the app name DB, transmitting, by the app name processing server, the corresponding word in the set language to the user terminal, and updating, by the user terminal, the corresponding word in the set language in an app search database (DB) of the user terminal when downloading the app requested in the step (a);

(c3) if the determination result of the step (c1) indicates that the corresponding word in the set language which one-to-one corresponds to the app name is not present in the existing records of correspondence in the app name DB, acquiring, by the app name processing server, the corresponding word in the set language by converting the app name through a machine learning technique, and updating, by the user terminal, the acquired corresponding word in the set language in the app search DB of the user terminal when downloading the app requested in the step (a); and (d) when the user terminal performs an app name search in the user terminal after the steps (c1)-(c3), not only searching for only app names installed in the user terminal, but also searching for the corresponding word in the set language in the app search DB which was updated in the step (c2) or step (c3).

2. The app name search method of claim 1, wherein in the step (c3), the app name processing server acquires the converted app name by converting the app name according to the loanword orthography of the set language, and acquires a modified app name by modifying the converted app name through the machine learning technique, and the user terminal updates the app name corresponding to the modified app name in the app search DB of the user terminal.

3. The app name search method of claim 1, wherein the app name is represented in a first language, and the set language is a second language different from the first language.

4. The app name search method of claim 1, wherein when two or more keyboard languages are installed, the acquiring of the corresponding word in the set language in the step (c3) is performed for all of the two or more keyboard languages.

5. An app name search system that performs the app name search method of claim 1, comprising:

the user terminal;

the app storage server configured to receive an app download request from the user terminal;

the app name processing server configured to receive the set language information and the app name from the user terminal and process the received information and name;

the app name DB of the app name processing server; and the app search DB of the user terminal.

* * * * *